United States Patent [19]

Bauer

[11] 4,201,309
[45] May 6, 1980

[54] TEST PLUG AND SEALING PLUG FOR CABLE FITTINGS

[75] Inventor: Josef Bauer, Germering, Fed. Rep. of Germany

[73] Assignee: Siemens Aktiengesellschaft, Berlin & Munich, Fed. Rep. of Germany

[21] Appl. No.: 18,185

[22] Filed: Mar. 7, 1979

[30] Foreign Application Priority Data

Mar. 13, 1978 [DE] Fed. Rep. of Germany ....... 2810840

[51] Int. Cl.² .................. F16J 15/10; B65D 39/12
[52] U.S. Cl. .................... 220/235; 277/116.6; 277/180
[58] Field of Search ........... 277/2, 102, 116.2, 235 B, 277/188 A, 180; 220/234–237

[56] References Cited

U.S. PATENT DOCUMENTS

| | | | |
|---|---|---|---|
| 614,547 | 11/1898 | Haworth | 220/237 |
| 633,537 | 9/1899 | Stewart | 220/235 |
| 2,070,579 | 2/1937 | Brooke | 220/235 |
| 2,083,956 | 6/1937 | Lang | 220/235 X |
| 2,566,816 | 9/1951 | Work | 220/235 X |
| 3,128,999 | 4/1964 | Schmitt | 267/1 |
| 3,215,442 | 11/1965 | Papenguth | 277/180 |
| 3,365,093 | 1/1968 | Malenke | 220/235 |
| 3,443,716 | 5/1969 | Evans | 220/235 |

FOREIGN PATENT DOCUMENTS

| | | | |
|---|---|---|---|
| 748701 | 4/1933 | France | 220/235 |
| 883464 | 11/1961 | United Kingdom | 277/180 |

*Primary Examiner*—Robert S. Ward, Jr.
*Attorney, Agent, or Firm*—Hill, Van Santen, Steadman, Chiara & Simpson

[57] ABSTRACT

A sealing device which may be used as either a test plug or a sealing plug for closing an opening in a wall of a fitting characterized by a bolt-shaped pressure component having a disk-shaped rim at one end and threads at the other end for threadably receiving a thrust nut. An elastic sealing member and a thrust washer are arranged between the rim and the thrust nut so that the sealing member will be radially expanded into engagement with the periphery of the opening in a wall of the member or fitting as the nut is threaded onto the pressure component.

10 Claims, 4 Drawing Figures

4,201,309

TEST PLUG AND SEALING PLUG FOR CABLE FITTINGS

BACKGROUND OF THE INVENTION

The present invention is directed to a sealing device for closing test openings in a wall of a pressure device such as a cable fitting.

In many cases for a cable installation, the cable sleeves must also be filled and this is accomplished by filling it with a corresponding casting resin. However, it is very often difficult to test these sleeves as to their sealing strength. Test openings, which are provided to determine the sealing strength of the fitting, are subsequently closed with suitable sealing compounds and matching plugs. The subsequent provision of such an opening and also the closing of the opening is often very difficult.

SUMMARY OF THE INVENTION

The present invention is directed to an object for providing a sealing device for closing test openings in a wall of a pressure device such as a cable fitting which sealing device can be securely and simply operated. The principles of the seals must equally be suited for the insertion of both the testing media as well as for a sealing media. The sealing device is constructed so that subsequently formed openings can be sealed with this sealing device.

The objects of the present invention are obtained by providing a sealing device which includes a bolt-shaped pressure component having a disk-shaped rim at one end and threads at the other end; a ring-shaped sealing member consisting of elastic material being arranged on the pressure component, the disk-shaped rim being of a diameter corresponding to the external diameter of the sealing member; a thrust washer received on the other end of the pressure member for engaging the sealing member; and a thrust nut threadably received on the threads of the pressure component to urge the washer against the sealing member so that the sealing member is compressed between the disk-shaped rim at one end of the component and the washer to cause radial expansion of the sealing member into engagement with the periphery of an opening in the wall of the enclosure.

The essence of the present invention can be seen in that an opening for either a test or a filling purpose in a wall of a pressure body such as a cable fitting must be tightly and readily sealed, but the accessibility of the opening is still retained. It is also possible to seal subsequently formed openings with the sealing device of the present invention as no auxiliary and/or sealing means are required. The operating characteristics of this sealing device consists of a cylindrical sealing member consisting of an elastic material which is inserted into the opening and is deformed by suitable pressure means so that it is strongly pressed radially against the periphery of the opening in the wall and thus gas tightly seals the opening. The sealing member is compressed as to its axial dimension by means of an axially directed pressure so that the member is enlarged in a radial direction and thus completely fills the opening and with the same pressure forms a gas tight seal. The principles of this sealing device can be utilized for employing a test plug having a valve or also for a simple sealing plug. Only the pressure component for the sealing part need be changed. The pressure component or part when the device is used as a sealing plug can be designed as a solid bolt-like member and when used in a test plug is a bolt-like member having a continuous bore for receiving a valve mechanism. It is also conceivable that the pressure part can be a valve member per se which must be designed with the desired external characters of the bolt-like pressure member of the present invention.

The pressure component may have a portion such as a disk-shaped rim embedded in the sealing member or the head or a disk-shaped rim may engage the end surface of the sealing member. The disk-shaped rim may extend radially outward with the surfaces which are substantially planar or the rim may have a conical surface tapering inward from the periphery of the rim to a shank-like portion of the component which portion has the threads.

To prevent the application of two much compression on the sealing member, the device may include means for limiting the amount of threading of the thrust nut on the threads of the pressure component. This means may be either a spacing shell telescopically received on the threaded other end of the component or using a cap nut as the thrust nut and, adjusting the length of the threaded portion of the pressure component to limit the minimum axial distance between the rim and nut.

DESCRIPTION OF THE PREFERRED EMBODIMENTS

Figure 1:
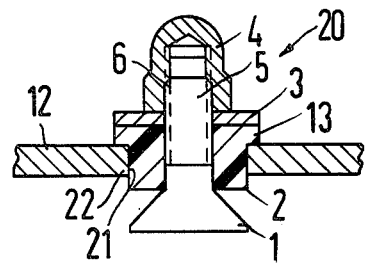
FIG. 1 is a cross-sectional view of an embodiment of the sealing device in accordance with the present invention.

The principles of the present invention are particularly useful in a sealing device generally indicated at 20 in FIG. 1 for sealing an opening 21 in a wall 12 of a pressure chamber such as the cable fitting. The sealing device as illustrated in FIG. 1 is not shown in the final state of assembly.

The sealing device includes a pressure component 5 having a disk-shaped rim or head 1 at one end, which rim has a conical surface converging inwardly to a shank portion having threads 6 which threads extend to the other end of the component 5. The outer diameter of the disk-shaped rim 1 is approximately the same as an exterior diameter of a sealing member 2 so that the rim 1 formed by the conical head of the component 5 as well as a portion of the sealing member 2 can be inserted through the opening 21. The sealing member 2 adjacent an opposite end is provided with an outwardly extending flange to provide a shoulder 13 which will prevent the complete passage of the sealing member 2 through the opening 21. A thrust washer 3 is received on the threaded portion of the component 5 and a cap nut 4 is threadably received on the threads 6 to provide axial compression of the sealing member 2 as the nut 4 is threaded onto the threads 6. During threading of the nut 4, a force is applied to the flange of the shoulder 13. With the threading of the nut 4 onto the threads 6, the conical surface of the head or rim 1 is pulled into the sealing member 2 which consists of elastic material. The conical surface of the rim 1 will cause radial expansion of the sealing member 2 from an axial pressure, which is caused by axially moving the washer 3 and rim 1 toward each other. With an increase of the radial expansion, a tight engagement with the periphery of the opening 21 is obtained as well as a forming of a bead adjacent a surface 22 of the wall 12. This effect forms a splendid fit of the sealing member 2 in the opening 21 and increases the sealing effect. The thrust nut 4, which is designed as a cap nut in this embodiment provides a stop when the end of the component 5 engages the bottom of the threaded bore of the cap nut. The amount of pressure, which can be applied on the member 2, can be adjusted by adjusting the length of the pressure component 5 with the depth of the threaded bore of the nut 4 so that a sufficient compression of the member 2 can be obtained without applying too great a pressure which might damage the member 2.

Figure 4:
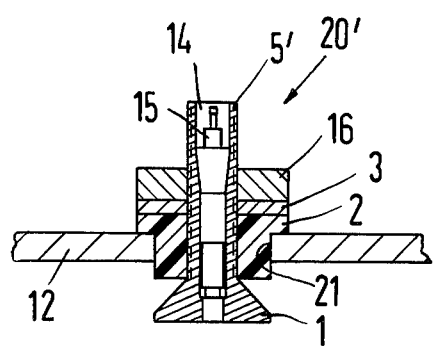
FIG. 4 shows a fourth embodiment of the sealing device according to the invention, which is similar to the device of FIG. 1 with the pressure component having an axial bore receiving a test valve.

In an embodiment of the sealing device 20' illustrated in FIG. 4, the pressure component 5' is provided with a continuous bore 14, which extends axially through the component. A valve 15 is inserted in the bore 14 and can be utilized to determine pressure conditions within the cable fitting. In the embodiment of the sealing device 20', the cap nut 4 is replaced by a beaded nut 16 which acts as the thrust nut.

Figure 2:
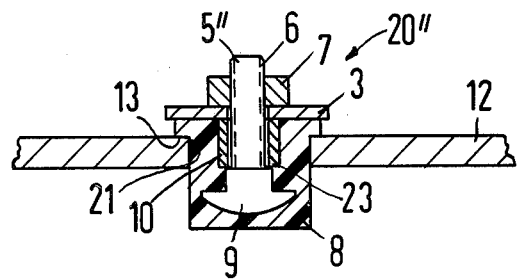
FIG. 2 shows an embodiment of the sealing device of the present invention.

In another embodiment the sealing member is generally indicated at 20" in FIG. 2. In this embodiment, a pressure component 5" has a disk-shaped rim 9, which is embedded in the sealing member 8 so that a portion of the pressure component is embedded in the sealing member. As illustrated, the sealing member 8 is also provided with an outwardly extending flange to provide the shoulder 13. It is noted that while the rim 9 is illustrated as being a flat-shaped rim, it may be provided with a cone-shaped head or rim such as the rim 1 of FIG. 1.

The device 20" includes means for preventing the application of excess pressure on the sealing component 8. As illustrated in this embodiment, the means includes a shoulder 23 on the pressure component 5", which shoulder 23 supports a spacing shell 10 which is telescopically received on the compression component 5". As illustrated, the spacing shell 10 is completely encircled by a portion of the sealing member 8. When the nut 7 is threaded onto the threads 6 of the pressure component 5", the amount of movement of the washer 3 toward the head 9 is limited by the axial length of the shell 10 and therefore the amount of compression which is applied against the member 8 is limited.

Figure 3:
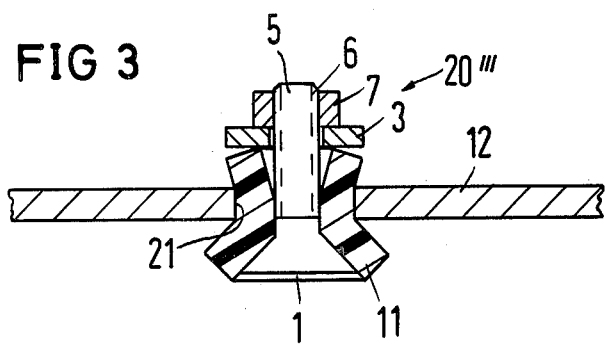
FIG. 3 shows another embodiment of the sealing device in accordance with the present invention.

Another embodiment is generally indicated at 20''' in FIG. 3. In this embodiment, an elastic hose 11 is used as the sealing member and is telescopically received on the pressure component 5. As illustrated, the elastic hose 11 is received between conical head or rim 1 and a washer 3 so that when the nut 7 is threaded on the threads 6 axial pressure is applied to the hose 11 to cause radial expansion of the hose 11 into sealing engagement with the opening 21 in the wall 12.

It should be noted that in each of the embodiments, the pressure component can be replaced by a valve component having the same exterior form so that the device can be used as a testing plug.

Although various minor modifications may be suggested by those skilled in the art, it should be understood that I wish to embody within the scope of the patent granted hereon, all such modifications as reasonably and properly come within the scope of my contribution to the art.

I claim:

1. A sealing device for closing a test opening in a wall of a cable fitting comprising a bolt-shaped pressure component having a disk-shaped rim at one end and threads at the other end; a ring-shaped sealing member consisting of an elastic material arranged on the pressure component, said disk-shaped rim having a diameter corresponding to the exterior diameter of the sealing member; a thrust washer telescopically received on the other end of the pressure component for engaging the sealing member; a thrust nut threadably received on the threads of the pressure component to urge the thrust washer against the sealing member to compress the sealing member between the washer and rim; and means for limiting the amount of threading of the thrust nut on the threads of the pressure component to limit the maximum amount of pressure applied to the sealing member, said means for limiting comprising a spacing shell being telescopically received on the threaded other end of the pressure component and being surrounded by a portion of the sealing member.

2. A sealing device according to claim 1, wherein said pressure component has an annular shoulder engaging one end of the spacing shell at a point spaced from the disk-shaped rim.

3. A sealing device according to claim 2, wherein said one end of the pressure component is embedded in the sealing member.

4. A sealing device according to claim 3, wherein the sealing member is provided with an outwardly extending flange to provide a shoulder for engaging a surface of the wall adjacent a periphery of the opening.

5. A sealing device according to claim 1, wherein the sealing member is formed by a length of hose consisting of an elastic material.

6. A sealing device according to claim 1, wherein said one end of the pressure component is embedded in the sealing member.

7. A sealing device according to claim 1, wherein the pressure component is provided with an axially extending continuous bore and said sealing device includes a valve member disposed in said bore.

8. A sealing device according to claim 1, wherein the ring-shaped rim of the pressure component has a conically-shaped surface extending from the periphery of the rim to the threaded portion of the pressure component.

9. A sealing device according to claim 8, wherein the sealing member is provided with an outwardly extending flange provided on a shoulder for engaging a surface of the wall adjacent the periphery of the opening.

10. A sealing device according to claim 1, wherein the sealing member is provided with an outwardly extending flange to provide a shoulder for engaging a surface of the wall adjacent a periphery of the opening.

* * * * *